(12) United States Patent
Xie et al.

(10) Patent No.: US 10,165,001 B2
(45) Date of Patent: Dec. 25, 2018

(54) METHOD AND DEVICE FOR PROCESSING COMPUTER VIRUSES

(71) Applicant: BEIJING QIHOO TECHNOLOGY COMPANY LIMITED, Beijing (CN)

(72) Inventors: Chongyang Xie, Beijing (CN); Min FU, Beijing (CN); Guiqiang Zou, Beijing (CN)

(73) Assignee: Beijing Qihoo Technology Company Limited, Beijing (CN)

(*) Notice: Subject to any disclaimer, the term of this patent is extended or adjusted under 35 U.S.C. 154(b) by 0 days.

(21) Appl. No.: 14/859,791

(22) Filed: Sep. 21, 2015

(65) Prior Publication Data
US 2016/0014144 A1    Jan. 14, 2016

Related U.S. Application Data

(62) Division of application No. 14/345,649, filed as application No. PCT/CN2012/081574 on Sep. 19, 2012.

(30) Foreign Application Priority Data

Sep. 19, 2011   (CN) .......................... 2011 1 0277746
Sep. 19, 2011   (CN) .......................... 2011 1 0278462

(51) Int. Cl.
    *H04L 29/06*     (2006.01)
    *G06F 21/56*     (2013.01)
    *H04L 29/08*     (2006.01)

(52) U.S. Cl.
    CPC ............ *H04L 63/145* (2013.01); *G06F 21/56* (2013.01); *G06F 21/562* (2013.01); *G06F 21/568* (2013.01); *H04L 67/10* (2013.01)

(58) Field of Classification Search
    CPC ... H04L 63/145; H04L 63/1441; G06F 21/56; G06F 21/562; G06F 21/568; G06F 21/554
    See application file for complete search history.

(56) References Cited

U.S. PATENT DOCUMENTS

| 5,960,170 A   | 9/1999 | Chen et al. |
| 7,216,366 B1  | 5/2007 | Raz et al. |
| 7,475,427 B2* | 1/2009 | Palliyil ................. G06F 21/566 726/24 |

(Continued)

FOREIGN PATENT DOCUMENTS

| CN | 1375775 A   | 10/2002 |
| CN | 101651678 A | 2/2010 |

(Continued)

*Primary Examiner* — Carl G Colin
*Assistant Examiner* — Vance M Little
(74) *Attorney, Agent, or Firm* — Baker & Hostetler LLP

(57) ABSTRACT

Techniques of scanning a set of files by a plurality of virus scanning modes are provided. The disclosed techniques includes operating a first scan on a set of files according to a first virus scanning mode to identify a first target file and obtain a first scanning result; operating a second scan on files of the set of files other than the first target file according to a second virus scanning mode to identify a second target file and obtain a second scanning result; wherein the first scan according to the first virus scanning mode uses less system resources than the second scan according to the second virus scanning mode.

10 Claims, 9 Drawing Sheets

(56) References Cited

U.S. PATENT DOCUMENTS

| | | |
|---|---|---|
| 8,584,235 B2 | 11/2013 | Topan et al. |
| 8,813,222 B1 | 8/2014 | Codreanu et al. |
| 2004/0015440 A1 | 1/2004 | Lai et al. |
| 2005/0021994 A1* | 1/2005 | Barton .................. G06F 21/562 726/26 |
| 2005/0022018 A1* | 1/2005 | Szor .................... H04L 63/1416 726/4 |
| 2005/0132184 A1 | 6/2005 | Palliyil et al. |
| 2006/0101282 A1* | 5/2006 | Costea .................... G06F 21/56 713/188 |
| 2006/0156401 A1* | 7/2006 | Newstadt ............ H04L 63/1408 726/22 |
| 2008/0301796 A1* | 12/2008 | Holostov .............. H04L 63/105 726/12 |
| 2009/0013405 A1 | 1/2009 | Schipka |
| 2009/0083852 A1 | 3/2009 | Kuo et al. |
| 2009/0094222 A1 | 4/2009 | McColgan et al. |
| 2010/0313035 A1* | 12/2010 | Turbin .................... G06F 21/56 713/189 |
| 2011/0197272 A1* | 8/2011 | Mony .................... G06F 21/566 726/12 |

FOREIGN PATENT DOCUMENTS

| | | |
|---|---|---|
| CN | 101685486 A | 3/2010 |
| CN | 101795267 A | 8/2010 |
| CN | 101894225 A | 11/2010 |
| CN | 102024113 A | 4/2011 |
| CN | 102279917 A | 12/2011 |
| CN | 102314571 A | 1/2012 |
| CN | 102346827 A | 2/2012 |
| CN | 102663284 A | 9/2012 |
| WO | WO 03010670 A1 | 2/2003 |
| WO | WO 2011003958 A1 * | 1/2011 ........... G06F 21/564 |

* cited by examiner

METHOD AND DEVICE FOR PROCESSING COMPUTER VIRUSES

CROSS REFERENCE TO RELATED APPLICATIONS

This application is a divisional of U.S. patent application Ser. No. 14/345,649, filed Mar. 18, 2014, which is the National Stage of International Application No. PCT/CN2012/081574, filed Sep. 19, 2012, which claims the benefits of Chinese Patent Application No. 201110278462.6, filed Sep. 19, 2011, and Chinese Patent Application No. 201110277746.3, filed Sep. 19, 2011, the disclosures of which are incorporated herein by reference in their entireties.

TECHNICAL FIELD

The present invention relates to the field of computer technology, and in particular, to a method and a device for processing a computer virus as well as a method and a device for multiple antivirus engines to kill viruses in parallel.

BACKGROUND ART

A computer virus is data that are programmed or embedded in a computer program to destroy the functionality of a computer. The virus may affect the normal use of the computer and be able to self-replicate, and the virus is usually presented in the form of a set of computer instructions or codes. An antivirus engine is a technical mechanism which can determine whether a particular program behaviour is a virus program (including a suspicious program). The antivirus engine is the main part of an anti-virus software and is a program for detecting and finding the virus. A virus database is a characteristic set of found viruses. In an anti-virus process, the characteristics 25 in the virus database are compared with all programs or files in a machine, and when the programs or files comply with these characteristics, they are determined as viruses.

During the research of the prior art, the inventor has found that every clearing procedure of antivirus engine is independent, that is, regardless of previous result output after the anti-virus engine scanning the files, the antivirus engine still scans all files next time, and the same virus file types may be found in the two scanning processes. It could be seen from above that, although the antivirus engine have powerful functions for clearing virus, when every time the 10 anti-virus engine scans all files, a lot of system resources will be occupied.

SUMMARY OF THE INVENTION

In view of the above problems, the present invention is proposed to provide a method and a device for multiple antivirus engines to clear viruses in parallel and a method and a device for processing a computer virus, which may be able to overcome or at least partially relieve the problems.

According to an aspect of the present invention, there is provided a method for multiple antivirus engines to clear viruses in parallel, the multiple antivirus engines including at least one first anti-virus engine and at least one second anti-virus engine, and the method comprising:

invoking the first anti-virus engine and scanning a first classified file in a file to be checked for and rid of viruses to obtain a first scanning result, wherein the first scanning result includes a target file in the first classified file;

invoking the second antivirus engine and scanning other file in the file to be checked for and rid of viruses, except the target file in the first classified file, to obtain a second scanning result; and outputting the first scanning result and the second scanning result.

According to another aspect of the present invention, there is provided a device for multiple antivirus engines to clear viruses in parallel, the multiple antivirus engines including at least one first anti-virus engine and at least one second anti-virus engine, and the device comprising:

a first invoking unit, configured to invoke the first anti-virus engine;

a first scanning unit, configured to scan a first classified file in a file to be checked for and rid of viruses by the first anti-virus engine to obtain a first scanning result, wherein the first scanning result includes a target file in the first classified file;

a second invoking unit, configured to invoke the second anti-virus engine;

a second scanning unit, configured to scan, by the second anti-virus engine, other file in the file to be checked for and rid of viruses, except the target file in the first classified files, to obtain a second scanning result; and an output unit, configured to output the first scanning result and the second scanning result.

According to another aspect of the present invention, there is provided a method for processing a computer virus, wherein several virus scanning modes which occupy different system resources during file scanning is pre-set, and the method comprises:

obtaining a file to be scanned; and invoking a corresponding virus scanning mode to scan the file to be scanned from a virus scanning mode which occupies lest system resources to a virus scanning mode which occupies most system resources in the several virus scanning modes.

According to still another aspect of the present invention, there is provided a device for processing a computer virus, including:

a setting unit, configured to pre-set several virus scanning modes which occupy different system resources during file scanning;

an obtaining unit, configured to obtain a file to be scanned; and a scanning unit, configured to invoke a corresponding virus scanning mode to scan the file to be scanned from a virus scanning mode which occupies lest system resources to a virus scanning mode which occupies most system resources in the several virus scanning modes.

According to still another aspect of the present invention, there is provided a computer program, comprising a computer readable code, wherein when the computer readable code is operated on a server, the server executes the above methods for multiple antivirus engines to clear viruses in parallel and/or the above methods for processing a computer virus as described.

According to still another aspect of the present invention, there is provided a computer readable medium, in which the above computer program is stored.

The embodiments of the invention use at least one first anti-virus engine and at least one second anti-virus engine antivirus to clear the virus with multiple antivirus engines, in which, the first anti-virus engine is invoked to scan the first classified file in the file to be checked for and rid of viruses to obtain the first scanning result, including a determine file in the first classified file; the second anti-virus engine is invoked to scan other file in the file to be checked for and rid of viruses except the target file in the first classified file to obtain the second scanning result; and the first scanning result and the second scanning result are output. When the embodiments of the invention employ the multiple antivirus engines to clearing a virus, the mode of the parallel anti-virus is used. According to the characteristics of different anti-virus engines, the first anti-virus engine may check and clear the first classified file, and the file that is unable to be cleared by the first anti-virus engine may be checked and cleared by the second anti-virus engine. Therefore, the system resources may be used efficiently, such that the multiple anti-virus engines will not repeatedly scan the same file.

The embodiments of the present invention pre-set several virus scanning modes which occupy different system resources during file scanning, obtain a file to be scanned and from a virus scanning mode which occupies lest system resources to a virus scanning mode which occupies most system resources in the several virus scanning modes, invoke a corresponding virus scanning mode to scan the file to be scanned. During the process of scanning the file for a virus by using the embodiments of the invention, since a corresponding virus scanning mode may be invoked from a virus scanning mode which occupies lest system resources to a virus scanning mode which occupies most system resources in the several virus scanning modes, a virus scanning mode with less occupation of system resources (for example, the memory scanning mode) may be employed to scan the file, such that the amount of files that are needed to be scanned by a scanning mode with a relatively large occupation of the system resources may be reduced, thereby increasing the clearing speed and saving the system resources; further, since the memory scanning mode with less occupation of system resources may save the scanning result of previous scan, the scanning result of most files can be identified by the memory scanning mode during the subsequent scanning, so as to further improve the scanning speed.

The above description is merely an overview of the technical solution of the present invention. In order to understand the technical means of the present invention more clearly, implement in accordance with the content of the specification and make above and other objects, features and advantages of the present invention more apparent, there are provided detailed embodiments of the present invention hereafter.

BRIEF DESCRIPTION OF THE DRAWINGS

Various other advantages and benefits will become apparent to the skilled in the art by reading the following detailed description of the preferred embodiment. The accompanied drawings are only for the purpose of illustrating the preferred embodiments, and not considered as limiting the present invention. Moreover, the same parts are denoted by the same reference numbers throughout the drawings, in which.

DETAILED DESCRIPTION OF THE EMBODIMENTS

The present invention will be further described below in conjunction with the accompanying drawings and specific embodiments.

Multiple antivirus engines may include at least one first anti-virus engine and at least one second anti-virus engine.

Figure 1:
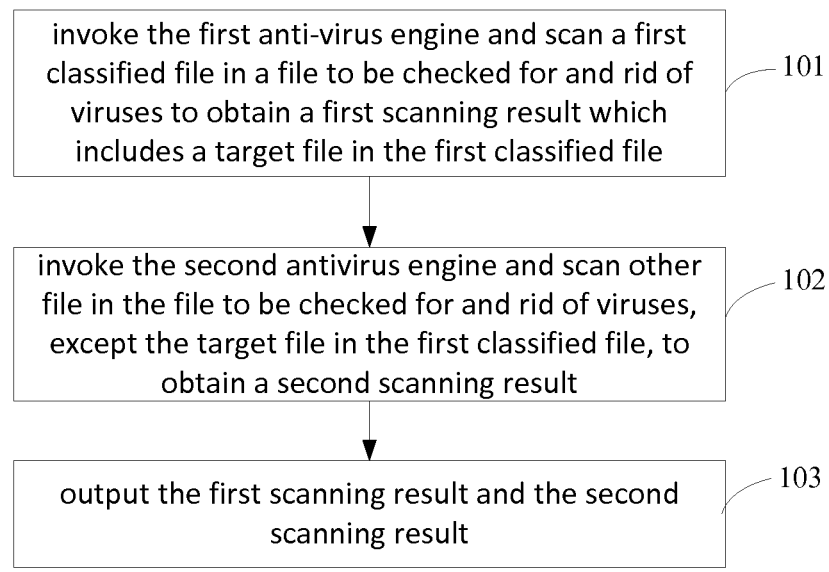
FIG. 1 schematically illustrates a flowchart of a method for multiple antivirus engines to clear viruses in parallel according to an embodiment of the present invention.

Referring to FIG. 1, it is a flowchart of a method for multiple antivirus engines to clear viruses in parallel according to a first embodiment of the present invention.

At step 101: invoke the first anti-virus engine and scan a first classified file in a file to be checked for and rid of viruses to obtain a first scanning result, wherein the first scanning result includes a target file in the first classified file.

In the embodiment of the invention, the first classified file is preferably a PE type file; the at least one first anti-virus engine comprises a cloud antivirus engine for clearing the PE (Portable Execute) type file, and/or a QVM (Qihoo support vector machine, an artificial intelligence engine) engine. Herein, the PE type file usually refers to a program file in a Windows operating system, and a commonly PE type file may include EXE, DLL, OCX, SYS, COM and other types of files.

In the embodiment of the invention, a parallel anti-virus process means that, during the checking process of the first anti-virus engine, a undetermined file in the checked file may be input to the second anti-virus engine for checking, without having to wait until the first antivirus engine finishes checking all the files to be checked for and rid of viruses and then performing clearing by the second anti-virus engine. Similarly, if there are at least two first anti-virus engines, aforementioned parallel anti-virus method may be applied to the at least two anti-virus engines.

Further, in the embodiment of the invention, since the first anti-virus engine is arranged to scan the first classified file, the first classified file in the file to be checked for and rid of viruses may be identified according to a classification feature of the first classified file, and then checked by the first anti-virus engine; or, the first anti-virus engine may have a function of identifying the first classified file, wherein during the checking process, the file to be checked for and rid of viruses belonging to the first classified file may be checked and cleared, and other file may be input to the second anti-virus engine for checking.

At step 102: invoke the second antivirus engine and scan other file in the file to be checked for and rid of viruses, except the target file in the first classified file, to obtain a second scanning result.

The second anti-virus engine is an anti-virus engine that mainly scans other file except the first classified file. It should be explained that the second anti-virus engine may have an ability of checking all the classification files. In the embodiment, the amount of checking files of each antivirus engine could be reduced through the parallel checking method, thereby increasing the clearing speed to improve the effective use of system resources. In this embodiment, the second anti-virus engine can include at least one anti-virus engine. For example, the second anti-virus engine may be a Bit Defender antivirus engine and/or the Little Red Umbrella anti-virus engine, and/or other existing anti-virus engines.

The parallel anti-virus process between the first anti-virus engine and the second anti-virus engine can be specifically described as follows: sequentially obtaining a preset amount of files in the file to be checked for and rid of viruses, scanning the first classified file in the preset amount of files by the first anti-virus engine to obtain a first scanning result including target file (in this embodiment, the target file mainly refers to a malicious file and/or a non-malicious file that can be determined by a first file) in the preset amount of files; inputting other file in the preset amount of files except the target file to the second anti-virus engine to be scanned by the second anti-virus engine; and without having scanned all the file to be checked for and rid of viruses, go to perform the step of sequentially obtaining a preset amount of files in the file to be checked for and rid of viruses, until the first anti-virus engine have scanned all the file to be checked for and rid of viruses.

At step 103: output the first scanning result and the second scanning result.

Figure 2:
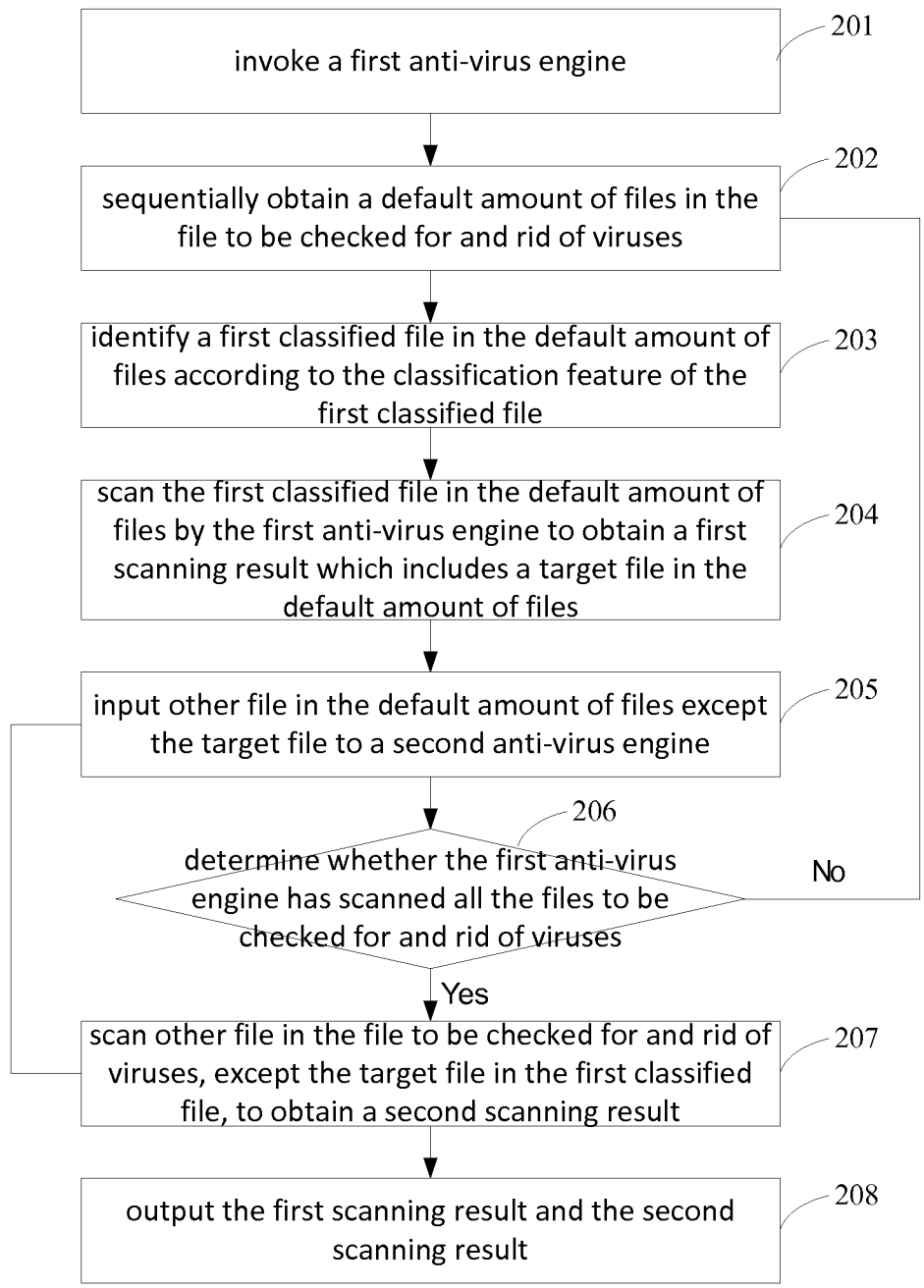
FIG. 2 schematically illustrates a flowchart of a method for multiple antivirus engines to clear viruses in parallel according to an embodiment of the present invention.

Referring to FIG. 2, it is a flowchart of a method for multiple antivirus engines to clear viruses in parallel according to a second embodiment of the present invention.

At step 201: invoke a first anti-virus engine.

In the embodiment of the invention, the first anti-virus engine may refer to a type of an anti-virus engine, the number of which may be one or more and not be restricted in the embodiment of the invention. For example, the first anti-virus engine can be an anti-virus engine specially used to clear a PE type file, and preferably include a cloud antivirus engine and/or a QVM engine.

At step 202: sequentially obtain a preset amount of files in the file to be checked for and rid of viruses.

When the embodiment is employed to scan the file to be checked for and rid of viruses, there is no need to wait the first antivirus engine finishes checking all the file to be checked for and rid of viruses and then clear by the second anti-virus engine. Accordingly, in the embodiment, a preset amount of files to be obtained may be set. For example, 100 files are obtained each time, that is, 100 files to be checked for and rid of viruses may be input to the first anti-virus engine each time.

At step 203: identify a first classified file in the preset amount of files according to the classification feature of the first classified file.

The first anti-virus engine may have a function of identifying the first classified file, and thus check the preset amount of files input thereto one by one, wherein for each file, the first anti-virus engine first identify whether the file belongs to the first classified file according to the classification feature of the first classified file.

At step 204, scan the first classified file in the preset amount of files by the first anti-virus engine to obtain a first scanning result which includes a target file in the preset amount of files.

The first anti-virus engine operates according to the identification result of the file, wherein if the file to be checked for and rid of viruses belongs to the first classified file, check the file according to a blacklist and/or a whitelist save in the anti-virus engine, if it is difficult to determine the attribute of the file based on the saved blacklist and/or whitelist, input the file to a second anti-virus engine for checking; if the current file is not the first classified file, directly input it to the second anti-virus engine for scanning.

At step 205: input other file in the preset amount of files except the target file to the second anti-virus engine, while execute steps 206 and 207.

In this embodiment, since the first anti-virus engine and the second anti-virus engine perform clearing in parallel, a undetermined file in the preset amount of files after being scanned by the first anti-virus engine may be input to the second anti-virus engine for checking, thereby executing step 207; at same time, since the first anti-virus engine scans the preset amount of files each time, it is required to determine whether all the files to be checked for and rid of viruses are scanned, so as to, without having scanned all the files, go to perform step 202 to continuously scan an unchecked file by the first anti-virus engine.

At step 206: determine whether the first anti-virus engine has scanned all the file to be checked for and rid of viruses, if so, execute step 207; otherwise, go to perform step 202.

At step 207: scan other file in the file to be checked for and rid of viruses, except the target file in the first classified file, to obtain a second scanning result.

At step 208: output the first scanning result and the second scanning result.

Figure 3:
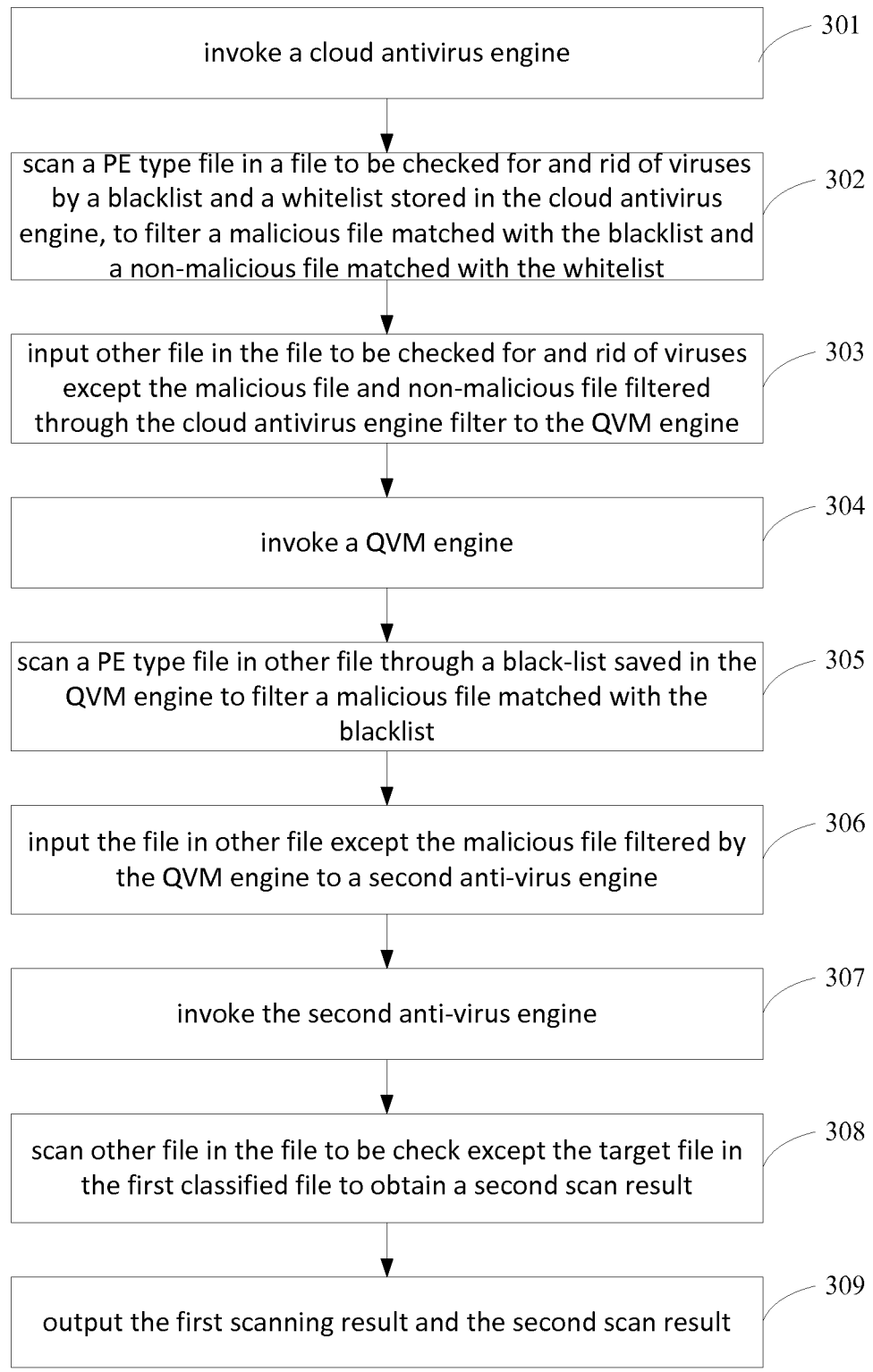
FIG. 3 schematically illustrates a flowchart of a method for multiple antivirus engines to clear viruses in parallel according to an embodiment of the present invention.

Referring to FIG. 3, it is a flowchart of a method for multiple antivirus engines to clear viruses in parallel according to a third embodiment of the present invention, wherein this embodiment is described by way of taking a cloud antivirus engine and a QVM engine as examples of a first anti-virus engine.

At step 301: invoke the cloud antivirus engine.

At step 302: scan a PE type file in a file to be checked for and rid of viruses by a blacklist and a whitelist stored in the cloud antivirus engine, to filter a malicious file matched with the blacklist and a non-malicious file matched with the whitelist.

The blacklist and whitelist are pre-stored in the cloud antivirus engine, wherein the blacklist contains a confirmed malicious PE type file, while the whitelist contains confirmed a non-malicious PE type file. During the process of checking the PE type file, the type of the input file to be checked for and rid of viruses is first determine, wherein if it is a PE type file, perform matching on the file with the blacklist and whitelist, if it is not a PE type file, input the file to a next anti-virus engine for checking.

In the embodiment, the PE type file is such a program that can be loaded and run directly by a WINDOWS operating system. This kind of file may be run without the interpretation of the system, or without the support of an additional software. The structure of the PE type file contains a number of PE information, based on which the structure characteristics of the PE file can be extracted. Herein, the structure characteristics of the PE file may include: PE file header characteristics, PE standard header characteristics, PE optional header characteristics, data directory characteristics and commonly-used section table characteristics.

At step 303: input other file in the file to be checked for and rid of viruses except the malicious file and non-malicious file filtered by the cloud antivirus engine to the QVM engine.

At step 304: invoke the QVM engine.

At step 305: scan the PE type file in other file through a black-list saved in the QVM engine to filter a malicious file matched with the blacklist.

The QVM engine may store the blacklist in advance, and the blacklist includes a confirmed malicious PE type file. Although both of the QVM engine and the cloud antivirus engine are able to check and clear the PE type file, their abilities of checking and clearing are different. Therefore, an undermined file checked by the cloud antivirus can be checked by the QVM engine.

At step 306: input the file in other file except the malicious file filtered by the QVM engine to the second anti-virus engine.

At step 307: invoke the second anti-virus engine.

At step 308: scan other file in the file to be check except the target file in the first classified file to obtain a second scan result.

At step 309: output the first scanning result and the second scan result.

It should be explained that, in the above-mentioned embodiment, the cloud antivirus engine, the QVM engine and the second anti-virus engine may check and clear viruses in parallel, that is, from the cloud antivirus engine, the preset amount of files in the file to be checked for and rid of viruses may be checked sequentially, the undetermined file in the checking result may be inputted to the QVM engine for clearing, the file that is difficult to be determined by the QVM engine may be inputted to the second anti-virus engine for clearing; after inputting the undetermined file in the checking result to the QVM engine, the cloud antivirus engine may check the subsequent preset amount of files, in such a manner that various anti-virus engine may perform checking and clearing at the same time.

As it can be seen from the above embodiments, when the present application employs the multiple antivirus engines to clear a virus, the mode of parallel anti-virus is used. According to the characteristics of different anti-virus engines, the first anti-virus engine may check and clear a virus from the first classified file, and the file that is unable to be cleared by the first anti-virus engine may be checked and cleared by the second anti-virus engine. Therefore, the system resources may be used efficiently, such that the multiple anti-virus engines will not repeatedly scan the same file.

According to one aspect of the present invention, corresponding to the method embodiments for multiple anti-virus engines to clear a the virus in parallel in the present application, the application also provides device embodiments for multiple anti-virus engines to clear viruses in parallel. Herein, the multiple antivirus engines may include at least one first anti-virus engine and at least one second anti-virus engine.

Figure 4:
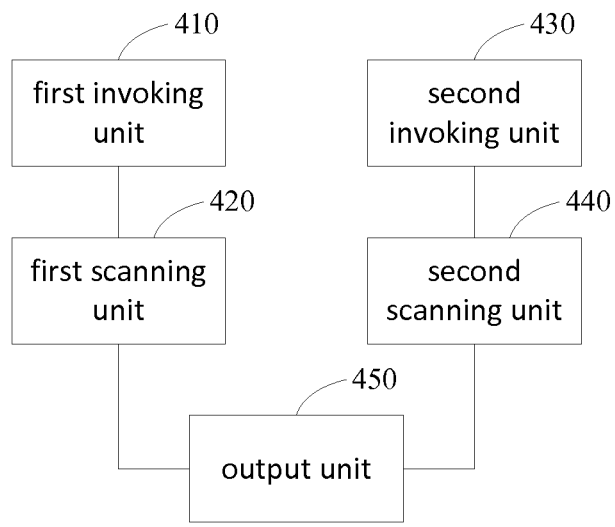
FIG. 4 schematically illustrates a block diagram of a device for multiple antivirus engines to clear viruses in parallel according to an embodiment of the present invention.

Referring to FIG. 4, it is a block diagram of a device for multiple antivirus engines to clear viruses in parallel according to an embodiment of the present invention.

The device comprises: a first invoking unit 410, a first scanning unit 420, a second invoking unit 430, a second scanning unit 440 and an output unit 450.

Herein, the first invoking unit 410 is configured to invoke the first anti-virus engine;

The first scanning unit 420 is configured to scan a first classified file in a file to be checked for and rid of viruses by the first anti-virus engine to obtain a first scanning result which includes a target file in the first classified file;

The second invoking unit 430 is configured to invoke the second anti-virus engine;

The second scanning unit 440 is configured to scan other file in the file to be checked for and rid of viruses, except the target file in the first classified file, by the second anti-virus engine to obtain a second scanning result;

The output unit 450 is configured to output the first scanning result and the second scanning result.

Further, the device may also comprise an identification unit (not shown in FIG. 4), configured to identify the first classified file in the file to be checked for and rid of viruses according to a classification feature of the first classified file.

When applying the device for multiple antivirus engines to clear viruses in parallel according to an embodiment of the present invention, preferably, the first classified file may be a PE type file, and at least one anti-virus engine may specifically be a cloud antivirus engine and/or a QVM engine for clearing the PE type file.

Herein, in the case that the first anti-virus engine is the cloud antivirus engine:

The first invoking unit is specifically configured to invoke the cloud antivirus engine;

The first scanning unit is specifically configured to scan the PE type file in the file to be checked for and rid of viruses by a blacklist and a whitelist stored in the cloud antivirus engine, to filter a malicious file matched with the blacklist and a non-malicious file matched with the whitelist; and input other file in the file to be checked for and rid of viruses except the malicious file and non-malicious file filtered by the cloud antivirus engine filter to the second anti-virus engine.

Herein, in the case that the first anti-virus engine is the QVM engine:

The first invoking unit is specifically configured to invoke the QVM engine;

The first scanning unit is specifically configured to scan a PE type file in the file to be checked for and rid of viruses through a blacklist saved in the QVM engine to filter a malicious file matched with the blacklist; and input other file in the file to be checked for and rid of viruses except the malicious file filtered by the QVM engine to the second anti-virus engine.

Herein, in the case that the first anti-virus engine is the cloud antivirus engine and the QVM engine:

The first invoking unit is specifically configured to invoke the cloud antivirus engine;

The first scanning unit is specifically configured to scan a PE type file in the file to be checked for and rid of viruses through a blacklist and a whitelist saved in the cloud antivirus engine to filter a malicious file matched with the blacklist and a non-malicious file matched with the whitelist; and input other file in the file to be checked for and rid of viruses except the malicious file and non-malicious file filtered by the cloud antivirus engine to the QVM engine.

The first invoking unit is also configured to invoke the QVM engine;

The first scanning unit is also configured to scan a PE type file in the other file through a blacklist saved in the QVM engine to filter a malicious file matched with the blacklist; and input the file in the other file except the malicious file filtered by the QVM engine to the second antivirus engine.

Figure 5:
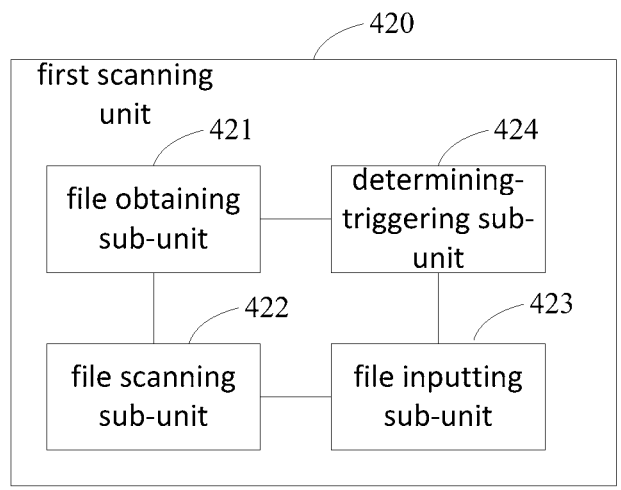
FIG. 5 schematically illustrates a block diagram of a first scanning unit of FIG. 4.

Referring to FIG. 5, it is a block diagram of the first scanning unit 420 in FIG. 4 according to the embodiment.

The first scanning unit 420 includes:

A file obtaining sub-unit 421, configured to sequentially obtain a preset amount of files in the file to be checked for and rid of viruses;

A file scanning sub-unit 422, configured to scan the first classified file in the preset amount of files by the first anti-virus engine to obtain the first scanning result including the target file in the preset amount of files;

A file inputting sub-unit 423, configured to input other file in the preset amount of files except the target file to the second anti-virus engine;

A determining-triggering sub-unit 424, configured to, without having scanned all the file to be checked for and rid of viruses, go to perform the function of triggering and executing the file obtaining sub-unit 421, until the first anti-virus engine has scanned all the file to be checked for and rid of viruses.

As it can be seen from above description of the embodiments, the invention employs at least one first anti-virus engine and at least one second anti-virus engine antivirus to clear the virus with parallel multiple antivirus engines, in which, the first anti-virus engine is invoked to scan the first classified file in the file to be checked for and rid of viruses to obtain the first scanning result, including a determine file in the first classified file; the second anti-virus engine is invoked to scan other file in the file to be checked for and rid of viruses except the target file in the first classified file to obtain the second scanning result; and output the first scanning result and the second scanning result. When the invention clears a virus by the multiple antivirus engines, the mode of parallel anti-virus is used. According to the characteristics of different anti-virus engines, the first anti-virus engine may check and clear the first classified file, and the file that is unable to be cleared by the first anti-virus engine file may be checked and cleared by the second anti-virus engine. Therefore, the system resources may be used efficiently, such that the multiple anti-virus engines will not repeatedly scan the same file.

According to one aspect of the present invention, there is provided a method for processing a computer virus.

Figure 6:
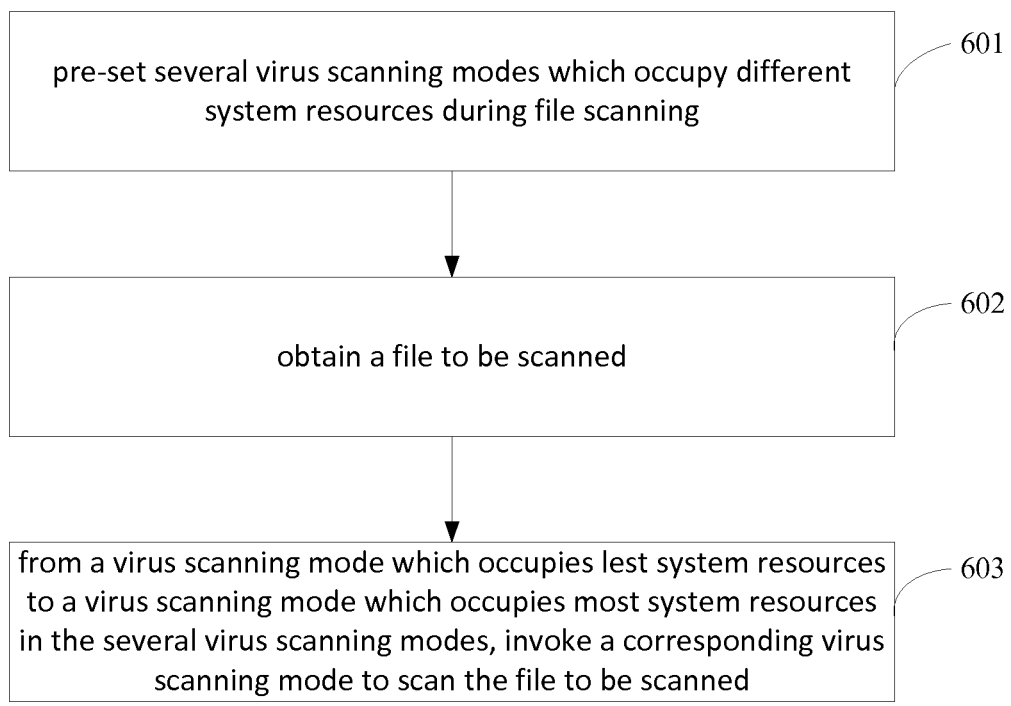
FIG. 6 schematically illustrates a flowchart of a method for processing a computer virus according to an embodiment of the present invention.

Referring to FIG. 6, it is a flowchart of a method for processing a computer virus according to a first embodiment of the present invention.

At step 601: pre-set several virus scanning modes which occupy different system resources during file scanning.

Herein, the several virus scanning modes are arranged from a virus scanning mode which occupies lest system resources to a virus scanning mode which occupies most system resources in the several virus scanning modes, and include at least two of the following modes: a memory scanning mode of scanning a virus according to the scanning result of the scanned file saved in a cache, wherein the scanning result includes file attribute information of a file identified as a malicious file and a non-malicious file, and the file attribute information includes file size, file modification time and a file path; a list scanning mode of scanning a virus through at least one of a pre-saved blacklist and whitelist; and an engine scanning mode of scanning a virus by an antivirus engine.

At step 602: obtain a file to be scanned.

At step 603: invoke a corresponding virus scanning mode to scan the file to be scanned from a virus scanning mode which occupies lest system resources to a virus scanning mode which occupies most system resources in the several virus scanning modes.

Herein, in the case that the several virus scanning modes at least include a first virus scanning mode and a second virus scanning mode, and the first virus scanning mode occupies less system resources than the second virus scanning mode, the first virus scanning mode is first invoked to scan the file to be scanned to obtain the determine file in the file to be scanned, and then the second virus scanning mode is invoked to only scan other file in the file to be scanned except the target file. Herein, the target file refers to a file identified as a malicious file or a non-malicious file.

Specifically, when the memory scanning mode, the list scanning mode and the engine scanning mode are used to scan the file to be scanned, the memory scanning mode is first invoked to scan the file to be scanned to obtain a file scanning result including a first target file; then the list scanning mode is invoked to only scan other file in the file to be scanned except the first target file, to obtain a second scanning result including a second target file; and finally the engine scanning mode is invoked to only scan a remaining file in the other file except the second target file to obtain a third scanning result including a third target file.

Figure 7:
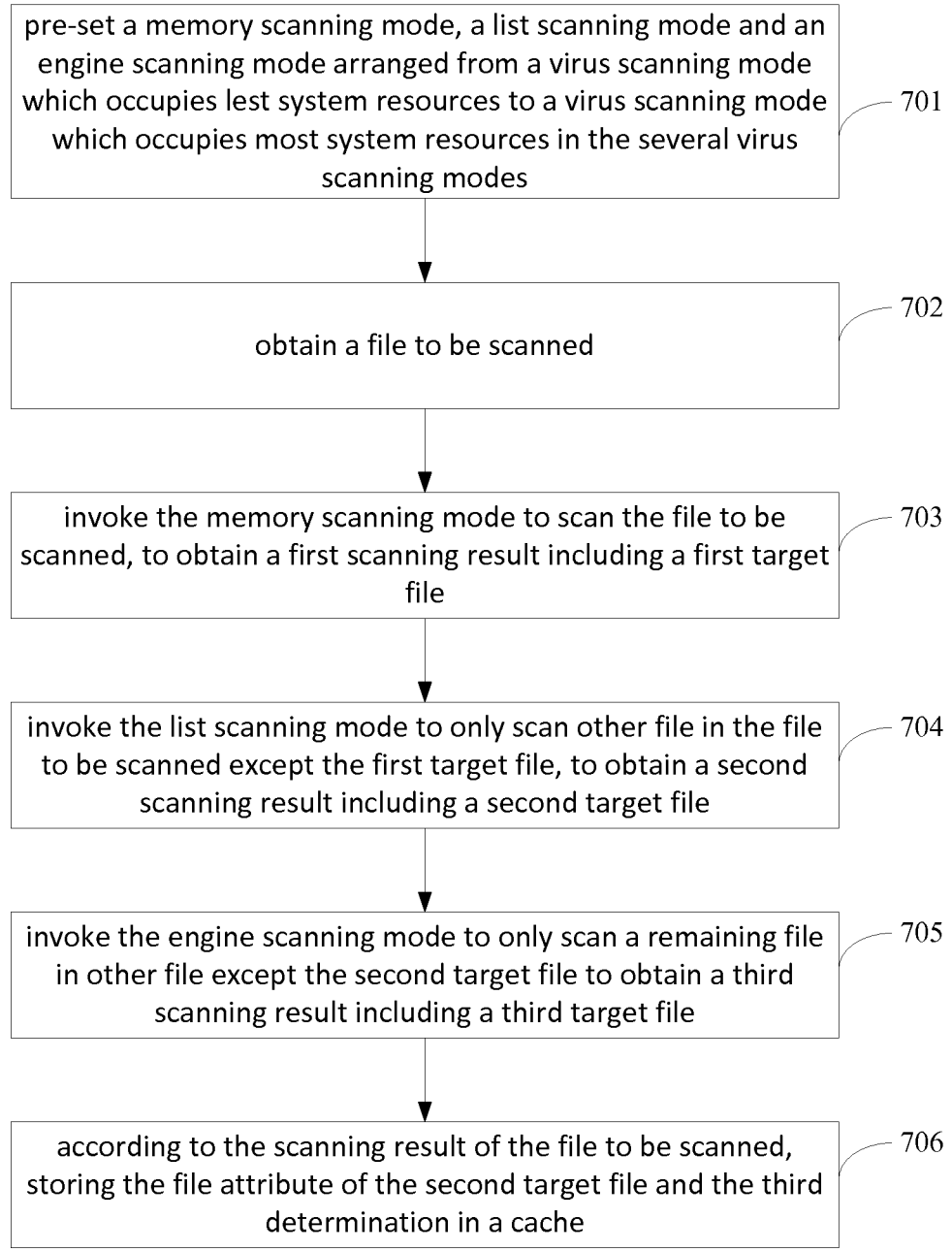
FIG. 7 schematically illustrates a flowchart of a method for processing a computer virus according to an embodiment of the present invention.

Referring to FIG. 7, it is a flowchart of a method for processing a computer virus according to a second embodiment of the present invention, wherein the processes of employing three scanning modes to scan a file to be scanned will be described.

Step 701: pre-set a memory scanning mode, a list scanning mode and an engine scanning mode arranged from a virus scanning mode which occupies lest system resources to a virus scanning mode which occupies most system resources in the several virus scanning modes.

Herein, the memory scanning mode is to scan a virus according to the scanning result of a scanned file saved in a cache, wherein the scanning result includes the file attribute information of a file identified as a malicious file and a non-malicious file, and the file attribute information includes file size, file modification time and a file path; the list scanning mode is to scan a virus through at least one of a pre-saved blacklist and whitelist; and the engine scanning mode is to scan a virus by the antivirus engine.

At step 702: obtain a file to be scanned.

At step 703: invoke the memory scanning mode to scan the file to be scanned, to obtain a first scanning result including a first target file.

The file attribute information, such as the file size, the file modification time and the file path, of the file to be scanned is obtained. In the system, a file attribute records some attribute information such as file size, modification time and file path after the last modification to the file. The file attribute is updated in real time with the modification to the file.

The file attribute information is compared with file attribute information saved in the cache, when the file attribute of the file to be scanned is matched with the file attribute saved in the cache, the file to be scanned may be identified as a malicious file or a non-malicious file, and when the file attribute of the file to be scanned is not matched with the file attribute saved in the cache, the file to be scanned may be identified as other file to be scanned through the list scanning mode. Since the file attribute information includes a variety of information, each of attribute information may be compared one by one according to a preset order during the comparison. For example, the file size is compared first, followed by matching the file modification time and finally the file path. When each of the attribute information of a file is consistent with that saved in the cache, it can be determined that file attribute of the file is matched with that saved in cache, and when any one of attribute information of a file is not consistent with that saved in the cache, it can be determined that file attribute of the file is not matched with that saved in cache.

Since the memory scanning mode is to scan a virus according to the scanning result of the scanned file saved in the cache, the target file in the first result obtained by the matching are a set of files that have been identified as a malicious file and a non-malicious file based on the previous scan. Since memory information can be read rapidly and a virus file have less change between two sequential scanning processes, most of files in the system can be checked by the memory scanning mode, thereby increasing the clearing speed and saving the system resources.

At step 704: invoke the list scanning mode to only scan other file in the file to be scanned except the first target file, to obtain a second scanning result including a second target file.

When scanning through a pre-saved blacklist, the filename of each file in other file may be compared with the filename pre-saved in the blacklist, and when a filename of a certain file is matched with a pre-saved filename, it can be determined that the file belongs to a malicious file of the second target file; when scanning through a pre-saved whitelist, the filename of each file in other file may be compared with the filename pre-saved in the whitelist, and when a filename of a certain file is matched with a pre-saved filename, it can be determined that the file belongs to a non-malicious file of the second target file.

Herein, the whitelist is usually maintained on a client by a user. The user may put an identified non-malicious file to the whitelist to save the file. The whitelist may record file name and file path information of the file. The blacklist is usually maintained by an anti-virus software provider and an identified malicious file may be added to the blacklist for saving according to monitoring.

At step 705: invoke the engine scanning mode to only scan a remaining file in other file except the second target file to obtain a third scanning result including a third target file.

When using the engine scanning mode to scan the remaining file, the following anti-virus engines can be employed, including: a cloud antivirus engine, a QVM engine (Qihoo support vector machine, an artificial intelligence engine), a Little Red Umbrella antivirus engine or any other existing anti-virus engines.

At step 706: according to the scanning result of the file to be scanned, store the file attribute of the second target file and the third determination in the cache.

Since, during the scanning process, the target file in the scanning results obtained by the list scanning mode and the engine scanning mode are different from those saved in the cache, in order to further improve the virus scanning speed of next time, the file attribute (including file size, file modification time and file path) of the second target file and the third target file is recorded into the cache, such that the file can be scanned directly through the memory scanning mode with a minimum occupation of resources system next time.

Figure 8:
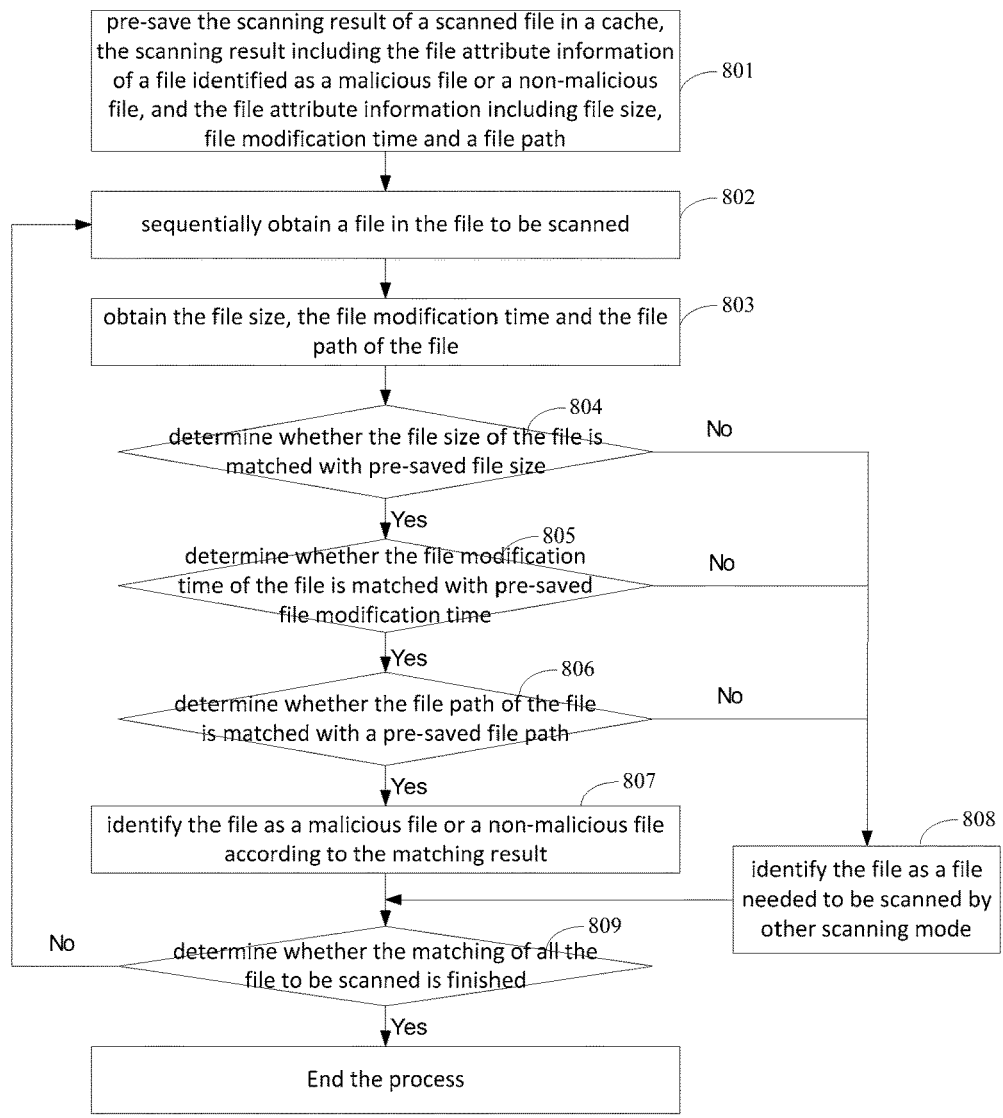
FIG. 8 schematically illustrates a flowchart of a method for processing a computer virus according to an embodiment of the present invention.

Referring to FIG. 8, it is a flowchart of a method for processing a computer virus according to a third embodiment of the present invention, wherein the processes of employing a memory scanning mode to scan a file to be scanned will be described in detail.

At step 801: pre-save the scanning result of a scanned file in a cache, wherein the scanning result includes file attribute information of a file identified as a malicious file or a non-malicious file, and the file attribute information includes file size, file modification time and a file path.

At step 802: sequentially obtain a file in the file to be scanned.

At step 803: obtain the file size, the file modification time and the file path of the file.

In a system, file attribute records some attribute information such as the file size, the modification time and the file path after the last modification to the file. The file attribute is updated in real time with the modification to the file.

At step 804: determine whether the file size of the file is matched with pre-saved file size, wherein if so, execute step 805; otherwise, execute step 809.

At step 805: determine whether the file modification time of the file is matched with pre-saved file modification time, wherein if so, execute step 806; otherwise, execute step 809.

At step 806: determine whether the file path of the file is matched a the pre-saved file path, wherein if so, execute step 807; otherwise, execute step 809.

At step 807: identify the file as a malicious file or a non-malicious file according to the matching result.

When each of attribute information of a file is consistent with that saved in the cache, it can be determined that file attribute of the file is matched with that saved in cache. At this time, if the file corresponding to the matched file attribute information in the memory is a malicious file, the file result of the file is a malicious file, and if the file corresponding to the matched file attribute information in the memory is a non-malicious file, the file result of the file is a non-malicious file.

Since the memory scanning mode is to scan a virus according to the scanning result of the scanned file saved in the cache, the target file in the first result obtained by the matching are a set of files that have been identified as a malicious file and a non-malicious file based on the previous scan. Since memory information can be read rapidly and a virus file has less change between two sequential scanning processes, most of files in the system can be checked by the memory scanning mode, thereby increasing the clearing speed and saving the system resources.

At step 808: identify the file as a file needed to be scanned by other scanning mode.

When any one of attribute information of a file is not consistent with that saved in the cache, it can be determined that file attribute of the file is not matched with that saved in the cache. In this case, that means there is a need for the file to be scanned by other scanning mode except the memory scanning mode, for example, by the list scanning mode and/or the engine scanning mode as described in the aforementioned embodiments.

At step 809: determine whether the matching of all the file to be scanned is finished, wherein if so, end the process, otherwise, go to perform step 802.

As it can be seen from the embodiment of the invention, during the process of scanning the file for a virus, since a corresponding virus scanning mode may be invoked from a virus scanning mode which occupies lest system resources to a virus scanning mode which occupies most system resources in the several virus scanning modes, a virus scanning mode with less occupation of system resources (for example, the memory scanning mode) may be employed to scan the file, such that the amount of files that are needed to be scanned by a scanning mode with a relatively large occupation of the system resources may be reduced, thereby increasing the clearing speed and saving the system resources; further, since the memory scanning mode with less occupation of system resources may save the scanning result of previous scan, the scanning result of most files can be identified by the memory scanning mode during the subsequent scanning, so as to further improve the scanning speed.

According to one aspect of the present invention, corresponding to the method embodiments for processing a computer virus, the application also provides device embodiments for processing a computer virus.

Figure 9:
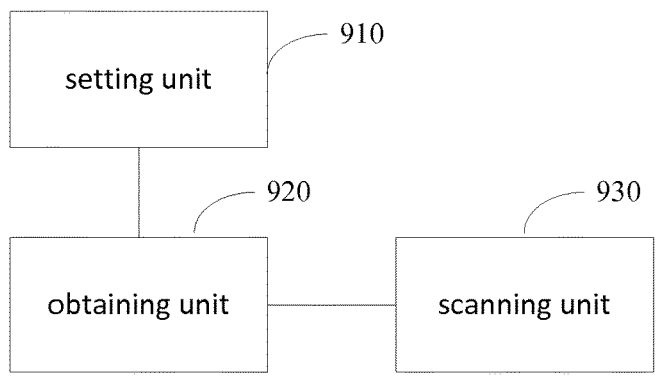
FIG. 9 schematically illustrates a block diagram of a device for processing a computer virus according to an embodiment of the present invention.

Referring to FIG. 9, it is a block diagram of a device for processing a computer virus according to a first embodiment of the present invention.

The device may comprise: a setting unit 910, an obtaining unit 920 and a scanning unit 930.

The setting unit 910 is configured to pre-set several virus scanning modes which occupy different system resources during file scanning.

The obtaining unit 920 is configured to obtain a file to be scanned;

The scanning unit 930 is configured to, from a virus scanning mode which occupies lest system resources to a virus scanning mode which occupies most system resources in the several virus scanning modes, invoke a corresponding virus scanning mode to scan the file to be scanned.

Herein, the several virus scanning modes set by the setting unit 910 at least include a first virus scanning mode and a second virus scanning mode, and the first virus scanning mode occupies less system resources than the second virus scanning mode.

The scanning unit 930 may specifically include (not shown in FIG. 9):

a first invoking and scanning unit, configured to invoke the first virus scanning mode to scan the file to be scanned to obtain a determine file in the file to be scanned; and a second invoking and scanning unit, configured to invoke the second virus scanning mode to only scan other file in the file to be scanned except the target file.

Figure 10:
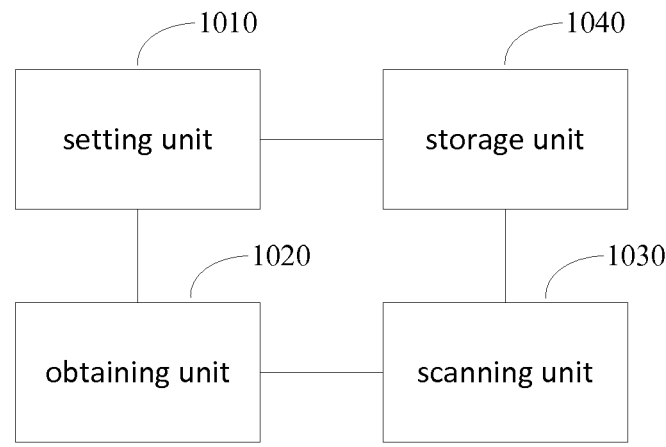
FIG. 10 schematically illustrates a block diagram of a device for processing a computer virus according to an embodiment of the present invention.

Referring to FIG. 10, it is a block diagram of a device for processing a computer virus according to a second embodiment of the present invention.

The device may comprise: a setting unit 1010, an obtaining unit 1020, a scanning unit 1030 and a storage unit 1040.

The setting unit 1010 is configured to pre-set several virus scanning modes which occupy different system resources during file scanning, wherein the several virus scanning modes set by the setting unit is arranged from a virus scanning mode which occupies lest system resources to a virus scanning mode which occupies most system resources in the several virus scanning modes, and includes at least two of the following modes: a memory scanning mode of scanning a virus according to the scanning result of a scanned file saved in a cache, wherein the scanning result includes the file attribute information of a file identified as a malicious file or a non-malicious file, and the file attribute information includes file size, file modification time and a file path; a list scanning mode of scanning a virus through at least one of a pre-saved blacklist and whitelist; and an engine scanning mode of scanning a virus by the antivirus engine.

The obtaining unit 1020 is configured to obtain a file to be scanned.

The scanning unit 1030 is configured to from a virus scanning mode which occupies lest system resources to a virus scanning mode which occupies most system resources in the several virus scanning modes, invoke a corresponding virus scanning mode to scan the file to be scanned; the scanning unit 1030 may include: a first scanning unit 1031, configured to invoke a memory scanning mode to scan the file to be scanned, to obtain a first scanning result including a first target file; a second scanning unit 1032. configured to invoke a list scanning mode to only scan other file in the file to be scanned except the first target file, to obtain a second scanning result including a second target file; and a third scanning unit 1033, configured to invoke a engine scanning mode to only scan a remaining file in other file except the second target file to obtain a third scanning result including a third target file.

The storage unit 1040 is configured to, according to the scanning result of the second scanning unit and the third scanning unit, store the file attribute of the second target file and the third target file in the cache.

Specifically, the first scanning unit 1031 may include (not shown in FIG. 10):

an information obtaining unit, configured to obtain the attribute information of the file to be scanned;

an information matching unit, configured to match the file attribute information with file attribute information stored in the cache; and a result determination unit, configured to, when the file attribute of the file to be scanned is matched with the file attribute saved in the cache, identify the file to be scanned as a malicious file or a non-malicious file, and when the file attribute of the file to be scanned is not matched with the file attribute saved in the cache, identify the file to be scanned as other file to be scanned through the list scanning mode.

Specifically, the second scanning unit 1032 may include (not shown in FIG. 10):

a blacklist scanning unit, configured to compare the filename of each file in other file with a filename pre-saved in the blacklist, and when the filename of a certain file is matched with a pre-saved filename, determine that the file belongs to a malicious file of the second target file; and a whitelist scanning unit, configured to compare the filename of each file in other file with the filename pre-saved in the blacklist, and when the filename of a certain file is matched with a pre-saved filename, determine that the file belongs to a non-malicious file of the second target file.

As it can be understood from the above embodiments, the present invention may pre-set several virus scanning modes which occupy different system resources during file scanning, obtain a file to be scanned and from a virus scanning mode which occupies lest system resources to a virus scanning mode which occupies most system resources in the several virus scanning modes, invoke a corresponding virus scanning mode to scan the file to be scanned. During the process of scanning the file for a virus using the embodiments of the invention, since a corresponding virus scanning mode may be invoked from a virus scanning mode which occupies lest system resources to a virus scanning mode which occupies most system resources in the several virus scanning modes, a virus scanning mode with less occupation of system resources (for example, the memory scanning mode) may be employed to scan the file, such that the amount of files that are needed to be scanned by a scanning mode with a relatively large occupation of the system resources may be reduced, thereby increasing the clearing speed and saving the system resources; further, since the memory scanning mode with less occupation of system resources may save the scanning result of previous scan, the scanning result of most files can be identified by the memory scanning mode during the subsequent scanning, so as to further improve the scanning speed.

The various modules and members according to the embodiments of the present invention can be implemented by hardware, or implemented by software modules operating on one or more processors, or implemented by the combination thereof. A person scleared in the art should understand that, in practice, a microprocessor or a digital signal processor (DSP) may be used to realize some or all of the functions of some or all of the members of the browser device according to the embodiments of the present invention. The present invention may further be implemented as equipments or device programs (for example, computer programs and computer program products) for executing some or all of the methods as described herein. The programs for implementing the present invention may be stored in the computer readable medium, or have a form of one or more signal. Such a signal may be downloaded from the Internet websites, or be provided in carrier, or be provided in other manners.

Figure 11:
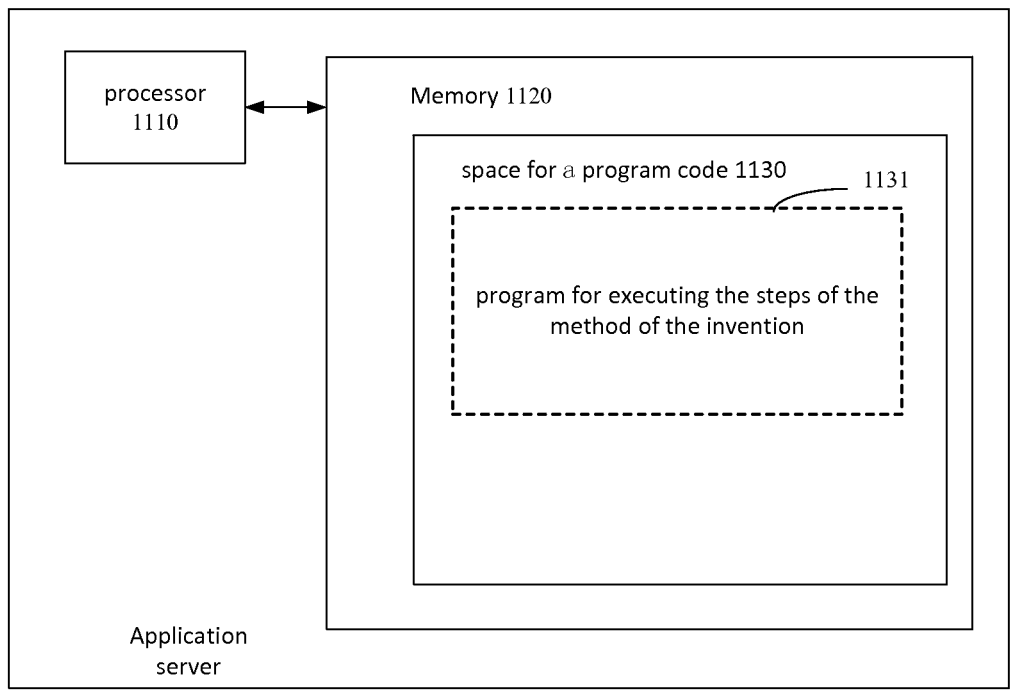
FIG. 11 schematically illustrates a block diagram of a server for executing the method according to the present invention.
Figure 12:
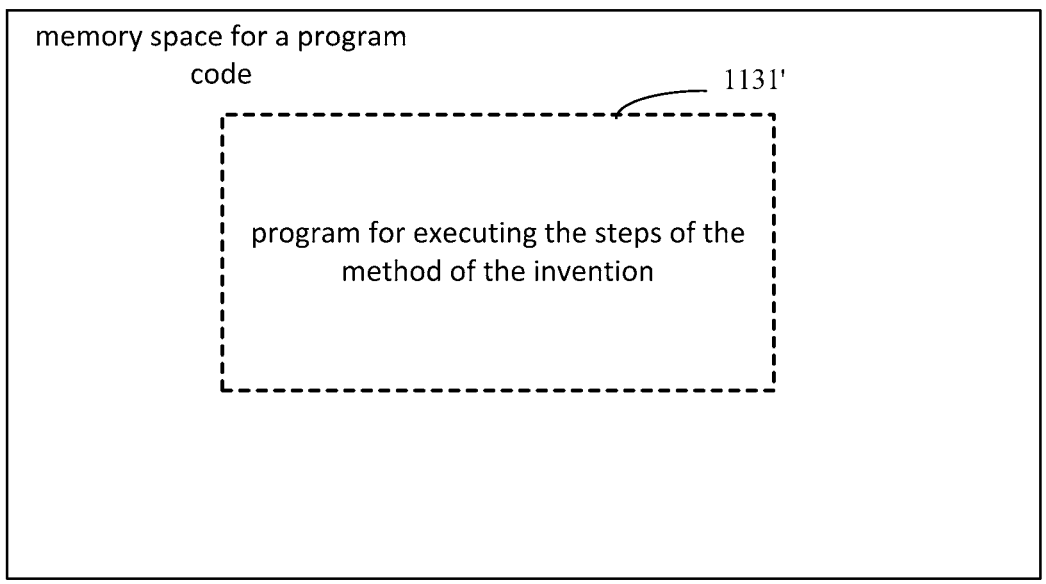
FIG. 12 schematically illustrates a memory unit for saving or carrying a program code for executing the method according to the present invention.

For example, FIG. 11 schematically shows a server that can implement the method of processing a computer virus and the method for the multiple antivirus engines to clear viruses in parallel according to the invention, for example, application server. Traditionally, the server comprises a processor 1110 and a computer program product or a computer readable medium in form of a memory 1120. The memory 1120 may be electronic memories such as flash memory, EEPROM (Electrically Erasable Programmable Read-Only Memory), EPROM, hard disk or ROM. The memory 1120 has a memory space 1130 for executing a program code 1131 of any steps of the above methods. For example, the memory space 1130 for a program code may comprise respective program code 1131 used to implement the various steps in the above mentioned method. The program code may be read from and/or be written into one or more computer program products. These computer program products comprise program code carriers such as hard disk, compact disk (CD), memory card or floppy disk. These computer program products are usually the portable or stable memory cells as shown in reference FIG. 12. The memory cells may be provided with memory sections, memory spaces, etc., similar to the memory 1120 of the server as shown in FIG. 11. The program codes may be compressed in an appropriate form. Usually, the memory cell includes computer readable codes 1131' which can be read by processors such as 1110. When these codes are operated on the server, the server may execute each step as described in the above method.

The terms "one embodiment", "an embodiment" or "one or more embodiment" used herein means that, the particular feature, structure, or characteristic described in connection with the embodiments may be included in at least one embodiment of the present invention. In addition, it should be noticed that, for example, the wording "in one embodiment" used herein is not necessarily always referring to the same embodiment.

A number of specific details have been described in the specification provided herein. However, it is possible to be understood that the embodiments of present invention may be practiced without these specific details. In some examples, in order not to confuse the understanding of the specification, the known methods, structures and techniques are not shown in detail.

It should be noticed that the above-described embodiments are intended to illustrate but not to limit the present invention, and alternative embodiments can be devised by the person skilled in the art without departing from the scope of claims as appended. In the claims, any reference symbols between brackets should not form a limit of the claims. The wording "comprising" does not exclude the presence of elements or steps not listed in a claim. The wording "a" or "an" in front of element does not exclude the presence of a plurality of such elements. The present invention may be achieved by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

It should also be noticed that the language used in the present specification is chosen for the purpose of readability and teaching, rather than selected in order to explain or define the subject matter of the present invention. Therefore, it is obvious for an ordinary skilled person in the art that modifications and variations could be made without departing from the scope and spirit of the claims as appended. For the scope of the present invention, the disclosure of present invention is illustrative but not restrictive, and the scope of the present invention is defined by the appended claims.

What is claimed:

1. A method for scanning a set of files by a plurality of virus scanning modes, comprising:
   pre-setting a first virus scanning mode, a second virus scanning mode, and a third virus scanning mode;
   obtaining a set of files;
   invoking the first virus scanning mode to scan the set of files, identifying a first target file and obtaining a first scanning result;
   invoking the second virus scanning mode to scan files of the set of files other than the first target file, identifying a second target file and obtaining a second scanning result;
   invoking the third virus scanning mode to scan remaining files of the set of files other than the first target file and the second target file, identifying a third target file and obtaining a third scanning result;
   saving file attribute information of the second target file and the third target file in a memory space and updating the first virus scanning mode;
   wherein the first virus scanning mode is based on a pre-saved scanning result, the pre-saved scanning result comprising file attribute information of an identified malicious file or an identified non-malicious file;
   wherein the second virus scanning mode is a list scanning mode, the list scanning mode based on at least one of a pre-saved blacklist and a pre-saved whitelist; and
   wherein the third virus scanning mode is different from the first virus scanning mode and the second scanning mode, the third virus scanning mode occupying more system resources than the first virus scanning mode and the second scanning mode, the system resources comprising memory, processor, or other hardware components.

2. The method of claim 1, wherein the invoking the first virus scanning mode to the set of files, further comprises:

obtaining a file from the set of files;
obtaining file attribute information of the file; and
determining whether the file attribute information of the file matches the file attribute information of the identified malicious file or the identified non-malicious file.

3. The method of claim 2 wherein the determining whether the file attribute information of the file matches the pre-saved file attribute information of an identified malicious file or an identified non-malicious file further comprises:
determining whether a file size of the file matches a pre-saved file size of the identified malicious file or the identified non-malicious file;
determining whether a file modification time of the file matches a pre-saved file modification time of the identified malicious file or the identified non-malicious file; and
determining whether a file path of the file matches a pre-saved file path of the identified malicious file or the identified non-malicious file.

4. The method of claim 3, further comprising:
identifying the file as a malicious file or a non-malicious file in response to a determination that the file size, file modification time, and the file path of the file match the pre-saved file size, file modification time, and file path of the identified malicious file or the identified non-malicious file, respectively.

5. The method of claim 3, further comprising:
identifying the file as one of the other files to be scanned according to the second virus scanning mode in response to a determination that at least one of the file size, file modification time, and the file path of the file does not match at least corresponding one of the pre-saved file size, file modification time, and file path of the identified malicious file or the identified non-malicious file.

6. The method of claim 1, wherein the invoking the second virus scanning mode to scan files of the set of files other than the first target file, identifying a second target file and obtaining a second scanning result further comprising:
identifying a first file of the other files is a malicious file in response to a determination that a filename of the file matches a file name in the pre-saved blacklist; and
identifying a second file of the other files is a non-malicious file in response to a determination that a filename of the file matches a file name in the pre-saved whitelist.

7. A system for scanning a set of files by a plurality of virus scanning modes, comprising:
a processor; and
a memory communicatively coupled to the processor to configure the processor to:
pre-set a first virus scanning mode, a second virus scanning mode, and a third virus scanning mode;
obtain a set of files;
invoke the first virus scanning mode to scan the set of files, identify a first target file and obtain a first scanning result;
invoke the second virus scanning mode to scan files of the set of files other than the first target file, identify a second target file and obtain a second scanning result;
invoke the third virus scanning mode to scan remaining files of the set of files other than the first target file and the second target file, identifying a third target file and obtaining a third scanning result; and
save file attribute information of the second target file and the third target file in a memory space and update the first virus scanning mode;
wherein the first virus scanning mode is based on a pre-saved scanning result, the pre-saved scanning result comprising file attribute information of an identified malicious file or an identified non-malicious file;
wherein the second virus scanning mode is a list scanning mode, the list scanning mode based on at least one of a pre-saved blacklist and a pre-saved whitelist; and
wherein the third virus scanning mode is different from the first virus scanning mode and the second scanning mode, the third virus scanning mode occupying more system resources than the first virus scanning mode and the second scanning mode, the system resources comprising memory, processor, or other hardware components.

8. The system of claim 7, wherein the memory further configuring the processor to:
identify a first file from the set of files as a malicious file or a non-malicious file in response to a determination that a file size, file modification time, and file path of the file match a pre-saved file size, file modification time, and file path of the identified malicious file or the identified non-malicious file, respectively; and
identify a second file from the set of files as one of the other files to be scanned according to the second virus scanning mode in response to a determination that at least one of a file size, file modification time, and file path of the second file does not match at least corresponding one of the pre-saved file size, file modification time, and file path of the identified malicious file or the identified non-malicious file.

9. A non-transitory computer-readable storage medium bearing computer-readable instructions that upon execution on a computing device cause the computing device at least to:
pre-set a first virus scanning mode, a second virus scanning mode, and a third virus scanning mode;
obtain a set of files;
invoke the first virus scanning mode to scan the set of files, identify a first target file and obtain a first scanning result;
invoke the second virus scanning mode to scan files of the set of files other than the first target file, identify a second target file and obtain a second scanning result;
invoke the third virus scanning mode to scan remaining files of the set of files other than the first target file and the second target file, identifying a third target file and obtaining a third scanning result;
save file attribute information of the second target file and the third target file in a memory space and update the first virus scanning mode;
wherein the first virus scanning mode is based on a pre-saved scanning result, the pre-saved scanning result comprising file attribute information of an identified malicious file or an identified non-malicious file;
wherein the second virus scanning mode is a list scanning mode, the list scanning mode based on at least one of a pre-saved blacklist and a pre-saved whitelist; and
wherein the third virus scanning mode is different from the first virus scanning mode and the second scanning mode, the third virus scanning mode occupying more system resources than the first virus scanning mode and the second scanning mode, the system resources comprising memory, processor, or other hardware components.

10. The non-transitory computer-readable storage medium of claim 9, wherein the computer-readable instructions that upon execution on the computing device cause the computing device at least to invoke the first virus scanning mode to scan the set of files, identify a first target file and obtain a first scanning result further comprise instructions that upon execution on the computing device cause the computing device at least to:

identify a first file from the set of files as a malicious file or a non-malicious file in response to a determination that a file size, a modification time, and a file path of the first file match a pre-saved file size, file modification time, and file path of the identified malicious file or the identified non-malicious file, respectively; and identify a second file from the set of files as one of the other files to be scanned according to the second virus scanning mode in response to a determination that at least one of a file size, file modification time, and file path of the second file does not match at least corresponding one of the pre-saved file size, file modification time, and file path of the identified malicious file or the identified non-malicious file.

\* \* \* \* \*